United States Patent
Jorgensen et al.

(10) Patent No.: US 8,200,486 B1
(45) Date of Patent: Jun. 12, 2012

(54) SUB-AUDIBLE SPEECH RECOGNITION BASED UPON ELECTROMYOGRAPHIC SIGNALS

(75) Inventors: Charles C. Jorgensen, Palo Alto, CA (US); Diana D. Lee, Palo Alto, CA (US); Shane T. Agabon, Millbrae, CA (US)

(73) Assignee: The United States of America as represented by the Administrator of the National Aeronautics & Space Administration (NASA), Washington, DC (US)

( * ) Notice: Subject to any disclaimer, the term of this patent is extended or adjusted under 35 U.S.C. 154(b) by 832 days.

(21) Appl. No.: 10/457,696

(22) Filed: Jun. 5, 2003
(Under 37 CFR 1.47)

(51) Int. Cl.
*G10L 15/00* (2006.01)
*G10L 15/16* (2006.01)
*G10L 15/20* (2006.01)
*G10L 17/00* (2006.01)

(52) U.S. Cl. ........ 704/233; 704/231; 704/232; 704/236; 704/246

(58) Field of Classification Search .......... 704/231–233, 704/236, 246
See application file for complete search history.

(56) References Cited

U.S. PATENT DOCUMENTS

| | | | | |
|---|---|---|---|---|
| 3,383,466 | A * | 5/1968 | Fry et al. .................. | 704/235 |
| 5,027,408 | A * | 6/1991 | Kroeker et al. ............ | 704/254 |
| 5,729,694 | A * | 3/1998 | Holzrichter et al. ....... | 705/17 |
| 5,794,190 | A * | 8/1998 | Linggard et al. .......... | 704/232 |
| 6,151,571 | A | 11/2000 | Pertrushin | |
| 6,182,039 | B1 | 1/2001 | Rigazio et al. | |
| 6,208,963 | B1 * | 3/2001 | Martinez et al. ........... | 704/232 |
| 6,366,908 | B1 | 4/2002 | Chong et al. | |
| 6,720,984 | B1 * | 4/2004 | Jorgensen et al. .......... | 715/863 |
| 7,062,093 | B2 * | 6/2006 | Steger ....................... | 382/216 |
| 2003/0163306 | A1 * | 8/2003 | Manabe et al. ............ | 704/220 |
| 2003/0171921 | A1 * | 9/2003 | Manabe et al. ............ | 704/232 |
| 2004/0044517 | A1 | 3/2004 | Palmquist | |
| 2006/0129394 | A1 | 6/2006 | Becker et al. | |

OTHER PUBLICATIONS

Hecht-Nielsen, "Theory of the Backpropagation Neural Network", International Joint Conference on Neural Networks, Jun. 1989.*
Basmajian, et al., Muscles Alive Their Functions Revealed by Electromyography, 1985, 429-469, Williams & Wilkins, Baltimore, MD, London, England, and Sydney, Australia.
Chan, et al., Hidden Markov Model Classification of Myoelectric Signal . . . , Proceedings of 23rd Annual EMBS International Conference, Oct. 25-28, 2001, IEEE, Istanbul, Turkey.
Chan, et al., Hidden Markov Model Classification of Myoelectric Signals in Speech, IEEE Engineering in Medicine and Biology, 2002, 143-146, IEEE.

(Continued)

*Primary Examiner* — Eric Yen
(74) *Attorney, Agent, or Firm* — John F. Schipper; Robert M. Padilla

(57) ABSTRACT

Method and system for processing and identifying a sub-audible signal formed by a source of sub-audible sounds. Sequences of samples of sub-audible sound patterns ("SASPs") for known words/phrases in a selected database are received for overlapping time intervals, and Signal Processing Transforms ("SPTs") are formed for each sample, as part of a matrix of entry values. The matrix is decomposed into contiguous, non-overlapping two-dimensional cells of entries, and neural net analysis is applied to estimate reference sets of weight coefficients that provide sums with optimal matches to reference sets of values. The reference sets of weight coefficients are used to determine a correspondence between a new (unknown) word/phrase and a word/phrase in the database.

18 Claims, 7 Drawing Sheets

OTHER PUBLICATIONS

Chan, et al., A Multi-Expert Speech Recognition System Using Acoustic . . . , Proceedings of the Second Joint EMBS/BMES Conference, Oct. 23-26, 2002, 72-73, IEEE, Houston, Texas.

Englehart, et al., Classification of the Myoelectric Sign . . . , Medical Engineering and Physics on Intelligent Data Analysis in Electromyography and Electroneurography, 1999.

Hudgins, et al., A New Strategy for Multifunction Myoelectric Control, IEE Transaction on Biomedical Engineering, 1993, 82-94, 40-1, IEEE.

Jorgensen, et al., Sub Auditory Speech Recognition Based on EMG Signals, Proceedings of the International Joint Conference on Neural Networks, 2003, 3128-3133, 4, IEEE.

Kingsbury, et al., Wavelet Transforms in Ima . . . , Proceedings of the 1st Euroopean Conference on Signal Analysis & Predictions, Jun. 24-27, 1997, 23-34, Prague, Zcech Republic.

Manabe, et al., Unvoiced Speech REcognition Using EMG—Mime Speech Recognition -, New Horizons, 2003, 794-795, Ft. Lauderdale, Florida.

Misiti, et al., Wavelets: A New Tool for Signal Analysis, Wavelet Toolbox for Use with MATLAB, User's Guide Version 1, 1996, The Math Works, Inc.

Morse, et al., Research Summary of a Scheme to Ascertain the Availability ofSpeech Info . . . , Comput. Biol. Med., 1986, 399-410, 16-6, Pergamon Journals Ltd., Great Britain.

Morse, et al., Use of Myoelectric Signals to . . . , Proceedings of IEEE Engineering in Medicine & Biology Society 11th Annual International Conference, 1989, 1793-1794, IEEE.

Morse, et al., Time Domain Analysis of . . . , Proceedings of Annual International Conference of IEEE Engineering in Medicine and Biology Society, 1990, 1318-1319, 12-3, IEEE.

Morse, et al., Speech Recognition Using M . . . , Proceedings of Annual International Conference of IEEE Engineering in Medicine & Biology Society, 1991, 1877-1878, 13-4, IEEE.

Morse, Preliminary Design and Implementation of a Scheme to Recognize Speech from Myoelec . . . , A Dissertation Presented to the Graduate School of Clemson Universtity, 1985.

Partridge, et al., Speech Through Myoelectric Signal Recognition SMyLES, Proceedings 28th Annual Southeast Regional Conference, Apr. 18-20, 1990, 288-295, ACM, Greenville, SC.

Press, et al., Nonlinear Models, Numerical Recipes in C,The Art of Scientific Computing, Second Edition, 1992, 681-689, Cambridge University Press.

Sugie, et al., A Speech Prosthesis Employing a Speech Synthesizer—Vowel Discrimination from . . . , IEEE Transactions on Biomedical Engineering, 1985, 485-490, BME-32-7, IEEE.

Trejo, et al., Multimodal Neuroelectric Interface Development, IEEE Transactions on Neural Systems and Rehabilitation Engineering, 2003, 199-204, 11-2, IEEE.

Wheeler, et al., Gestures as Input: Neuroelectric Joysticks and Keyboards, Pervasive Computing, 2003, 56-61, IEEE CS and IEEE ComSoc.

Graciarena, et al., Combining Standard and Throat Microphones for Robust Speech Recognition, IEEE Signal Processing Letters, Mar. 2003, 72-74, 10-3, IEEE.

Junqua, et al., the Lombard Effect: A Reflex to Better Communicate With Others in Noise, IEEE International Conference on Acoustics, Speech, and Signal Processing, Mar. 15-19, 1999, 2083-2086, 4, IEEE.

NG, et al., Denoising of Human Speech Using Combined Acoustic and EM Sensorsignal Processing, IEEE International Conference on Acoustics, Speech, and Signal Processing, Jun. 5-9, 2000, 229-232, 1, IEEE.

Nonfinal Rejection in related case, U.S. Appl. No. 11/169,265, mailed Jun. 19, 2008.

Response to Nonfinal Rejection in related case, U.S. Appl. No. 11/169,265, mailed Jun. 19, 2008. Response filed Dec. 16, 2008.

* cited by examiner

US 8,200,486 B1

SUB-AUDIBLE SPEECH RECOGNITION BASED UPON ELECTROMYOGRAPHIC SIGNALS

FIELD OF THE INVENTION

This invention relates to analysis of electromyographic signals produced in a human body

BACKGROUND OF THE INVENTION

Communications between two or more humans, or between a human and a machine, is traditionally dominated by visual and verbal information and alphanumeric input. Efforts to automate human-to-human or human-to-machine communication, such as commercial speech recognition have emphasized the audible aspects. A totally auditory communication strategy places a number of constraints on the communication channels, including sensitivity to ambient noise, a requirement for proper formation and enunciation of words, and use of a shared language. The physical limitations of sound production and recognition also become problematic in unusual environments, such as those involving hazardous materials (HAZMATs), extra vehicular activity (EVA) space tasks, underwater operations and chemical/biological warfare (CBW). Conventional auditory expression may be undesirable for private communication needed in many situations encountered daily, such as discrete or confidential telephone calls, offline or sotto voce comments during a teleconference call, certain military operations, and some human-to-machine commands and queries. Communication alternatives that are both private and not dependent upon production of audible signals are valuable.

One proposed method for studying alternative means of communication is direct understanding of brain signals, which bypasses speech and its analysis altogether. J. R. Wolpaw et al, "Brain-computer interface technology: a review of the first international meeting," I.E.E.E. Trans. on Rehabilitation Engineering, vol. 8 (2000) 164-171, recently published a review of the state of electroencephalograph (EEG) analysis. Several practical difficulties are encountered for near term application of pure EEG approaches, due to use in EEG of aggregated surface measured brain potential. Additionally, one confronts the nonlinear complexity and idiosyncratic nature of the signals. An alternative, invasive EEG measurement and analysis, is not considered practical for widespread use, except for extreme medical conditions.

What is needed is a sub-audible communication system that provides one or more tiers, in addition to conventional audible communication, to exchange or transfer information compactly, reliably and reasonably accurately. Preferably, the amount of computation required should be modest and not be out of proportion to the information obtained through the signal processing.

SUMMARY OF THE INVENTION

These needs are met by the invention, which provides a system for receipt and analysis of sub-audible signals to estimate and provide a characterization of speech that is sotto voce or is not fully formed for purposes of normal speech recognition. This system relies on surface measurement of muscle signals (i.e., electromyographic or EMG signals) to discriminate or disambiguate speech signals produced with relatively little acoustic input. In one alternative, EMG signals are measured on the side of a subject's throat, near the larynx, and under the chin near the tongue, to pick up and analyze surface signals generated by a tongue (so-called electropalatogram or throat EPG signals). This approach relies on the fact that audible speech muscle control signals must be highly repeatable, in order to be understood by others. These audible and sub-audible signals are intercepted and analyzed before sound is generated using these signals. The processed signals are fed into a neural network pattern classifier, and near-silent or sub-audible speech that occurs when a person "talks to himself or to herself" is processed. In this alternative, the tongue and throat muscles still respond, at a lowered intensity level, as if a word or phrase (referred to collectively herein as a "word") is to be made audible, with little or no external movement cues present. Where sufficiently precise sensing, optimal feature selection and good signal processing are available, it is possible to analyze these weak signals to perform, or direct performance of, useful tasks without conventional vocalization, thus mimicking an idealized thought-based approach.

In a training phase, the beginning and end of a sub-audible speech pattern ("SASP") is first determined for each of R spoken instances of a word in a database including Q words in a window of temporal length 1-4 sec (preferably about 2 sec), are provided and processed. A Signal Processing Transform (SPT) operation (characterized in the text) is performed on each data sample. The resulting transforms, evaluated at a selected sequence of transform parameter values, become entries in a matrix M, where a first matrix axis may represent different scale factors and a second matrix axis may represent a time associated with a window. The matrix M is tessellated into groups of cells (e.g., of rectangular shape), and each cell is represented by a feature for that cell. The cell features are rearranged as a vector, having K entries $v_k(q;r)$. For each word (q) in the database and for each spoken instance (r) of a (known) word, a sum $S1(q;r)_h$ is formed of cell representative number k multiplied by a first set of weight coefficients $w_{1,k,h}(q,r)$ and summed over k=1, . . . , K, and a first activation function (or functions) A1 $\{S1(q;r)_h\}$ of the first sum S1. The first activation value is multiplied by a second set of weight coefficients $w_{2,h,g}(q;r)$ and summed over h=1, . . . , H to form a second sum $S2(q;r)_g$, and a second activation function (or functions) A2$\{S2(q;r)_g\}$ is computed. The weight coefficients $w_{1,k,h}(q;r)$ and $w_{2,h,g}(q;r)$ are adjusted, using a neural net learning procedure, to provide at least one reference activation function value $A(q;ref)_g$ for which a difference, $\Delta 1(q;r)_g=|A(q;ref)_g-A2\{S2(q;r)_g,\}|$, is no greater than a first error threshold $\epsilon(thr;1)$. for all spoken instances, r=1, . . . , R and all value of the weight index g, with corresponding sets of weight coefficients $\{w_{1,k,h}(q;ref)\}$ and $\{w_{2,h,g}(q;ref)\}$. This completes the training phase of the invention.

An SASP including an unknown word is provided and sampled in a sequence of windows, as in the training phase. Signal Processing Transforms are computed for the sample values in each of these windows, a matrix M' is formed and tessellated into cells, and a representative value for each cell is optionally normalized, as before. The representative cell values are formatted as a vector, with entries $v_k$. Using the already-determined weights $w_k(q;ref)$ for each word (q), a sum $S'(q;ref)$ of the vector entries $v_k$, multiplied by the corresponding weights $v_k(q;ref)$ is formed, an activation function value $A\{S'(q;ref)\}$ is computed, and differences $\Delta 2(q)_g=|A(q;ref)_g-A2\{S2(q;r;j)_g,\}|$ are computed and compared with a second error threshold $\epsilon(thr;2)$. If at least one word (q=q0) can be found for which $\Delta 2(q0) \leq \epsilon(thr;2)$, at least one word (q=q0) with minimum value $\Delta 2(q0)$ is interpreted as corresponding to the unknown word.

The first phase of the technique is a learning procedure, whereby the system learns to distinguish between different known words in a database and provides reference sets of neural net weight coefficients for this purpose. In a second, word recognition phase, the weight coefficients are applied to one or more unknown words to determine if an unknown word is sufficiently similar to a word in the database. This technique provides several advantages, including minimization of word variations through use of a shared language and shared sound production, a potential to connect the sub-audible signal recognition to a flexible, highly developed speech recognition architecture non-invasive sensing, reasonably robust response to physiological variations, and privacy.

DESCRIPTION OF BEST MODES AND THE INVENTION

Figure 1:
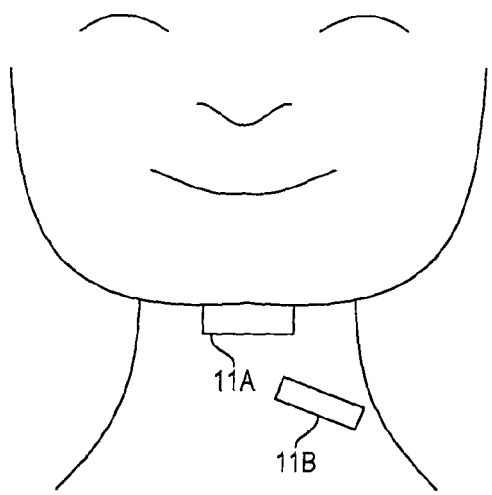
FIG. 1 illustrates placement of signal recording electrodes in an initial experiment on sub-audible speech analysis.
Figure 2A:
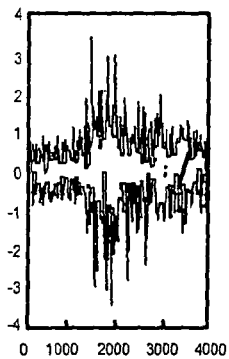
FIGS. 2A-2F are graphical views of sub-audible signals corresponding to the generic words "stop", "go", "left", "right", "alpha" and "omega."
Figure 2B:
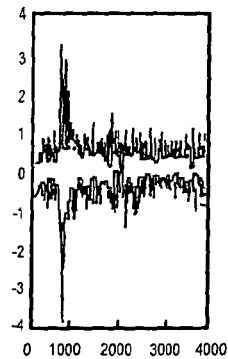
Figure 2C:
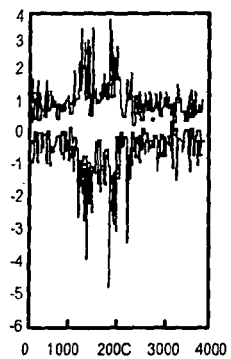
Figure 2D:
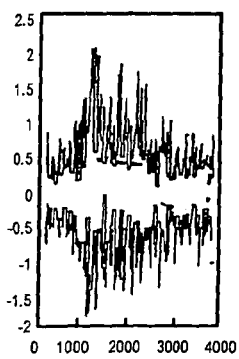
Figure 2E:
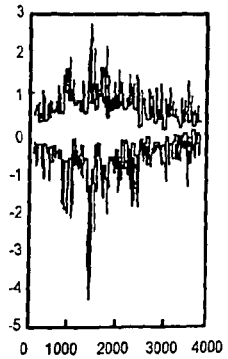
Figure 2F:
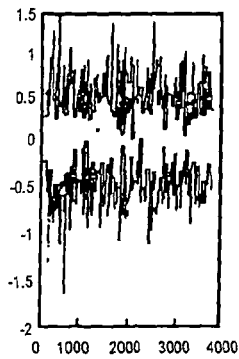

In some initial tests, sub-audible pronunciation of six English words ("stop", "go", "left", "right", "alpha" and "omega") and ten numerals ("1", "2", "3", "4", "5", "6", "7", "8", "9" and "0") were recorded for each of three subjects, ages 55, 35 and 24, to provide a control set of words for a small graphic model that might be used to provide commands on a Mars Rover system, for example. The words "alpha" and "omega" may be used to enter a command to move faster or slower, or up or down, or forward or backward, as appropriate under the circumstances. EMG data were collected for each subject, using two pairs of self-adhesive AG/AG-C1 electrodes, located near the left and right anterior external area of the throat, about 0.25 cm back from the chin cleft and about 1.5 cm from the right and left sides of the larynx, as indicated in FIG. 1. Initial results indicate that one pair, or more pairs if desired, of electrodes, located diagonally between the cleft of the chin and the larynx in a non-symmetrical relationship, will suffice for recognition in small word sets. Signal grounding usually relies on attachment of an additional electrode to the right or left wrist or another location on the body. When data are acquired using wet electrodes, each electrode pair is connected to a commercial Neuroscan or equivalent signal amplifier and recorder that records the EMG responses at a sampling rate of up to 20 KHz. A 60 Hz notch filter is used to reduce ambient signal interference.

One hundred or more exemplars for each word were initially recorded for each subject over a six-day interval, in morning and afternoon sessions. In a first group of experiments, the signals were sectioned offline into two-second time windows with variable window start times, and extraneous signals (coughs, swallows, body noises, etc.) were removed using SCAN 4 Neuroscan software. FIGS. 2A, 2B, 2C, 2D, 2E and 2F graphically illustrate representative EMG blocked signals for six windows, corresponding to the words "stop", "go", "left", "right", "alpha" and "omega", respectively. The blocked signals for these words are not wholly reproducible and may be affected by the test subject's health and the time (of day) the particular signal is recorded and analyzed. The technique must also take into account the changing signal-noise ratio and/or changing amplitudes of the signals.

For signal feature processing, Matlab scripts were developed to provide a uniform signal processing system from recording through network training. These routines were used to receive and transform the raw signals into feature sets, to dynamically apply a threshold to the transformed signals, to compensate for changes in electrode locations, to adjust signal-noise ratios, and to implement neural network algorithms for pattern recognition and training. EMG artifacts, such as swallowing, muscle fatigue tremors and coughs, were removed during preprocessing of the windowed samples. In a real time application, artifact filters would be incorporated and applied to introduction of new words into the lexicon.

Sectioned signal data for each word were transformed into usable classifier feature vectors using preprocessing transforms, combined with a coefficient reduction technique. Several transforms were tested, including: (i) a short time interval Fourier Transform (STFT), requiring multiple overlapping windows; (ii) discrete wavelets (DWTs) and continuous wavelets (CWTs) using Daubechies 5 and 7 bases; (iii) dual tree wavelets (DTWTs) with a near_sym_a 5,7 tap filter and a Q-shift 14,14 tap filter; (iv) Hartley Transforms; (v) Linear Predictive Coding (LPC) coefficients and (vi) uniformly and nonuniformly weighted moving averages. Feature sets were created differently for each of these transform approaches, depending upon the unique signal processing approaches, with different pattern discriminations.

The most effective real time SPTs were the windowed STFTs and the DTWT coefficient matrices, each of which was post-processed to provide associated feature vectors. One suitable procedure is the following. Transform coefficient vectors are generated for each word, using, for example, the STFT or the DWT applied to the magnitude (absolute value) of the raw signal amplitude. Where unipolar, rather than bipolar, electrodes are used, positive and negative sign signals are distinguishable, and STFTs and DWTs could be applied to the raw signal amplitudes without automatic formation of an absolute value. Vectors were post processed using a Matlab routine to create a matrix of spectral coefficients. This matrix is tessellated into a set of sub-matrices or cells, depending upon the spectral information complexity. Tessellation sizes were determined in part by average signal energy in a given region of the spectral matrix. Uses of equal and unequal segmentation sizes were considered. A representative value was calculated for each candidate sub-matrix, to reduce the number of features or variables presented to the pattern recognition algorithm and to represent average coefficient energy.

A simple mean or average signal energy within a cell was used as a cell representative or "feature." Other first order statistical values, such as medians, modes and maximum sub-matrix values, can be used but appear to provide no substantial improvement over use of a simple mean of signal energy. The result of this approach is a fixed length feature vector for each sub-audible word tested. Dual tree wavelets are attractive here, as opposed to standard discrete wavelets, to minimize the normal wavelet sensitivity to phase shifts. Continuous wavelets (CWTs) are not presently practical for real time computations. The Hartley Transform, which provides additional information on signal behavior along a non-real line in the transform plane, was also explored, as was use of moving averages of various lengths.

Feature vectors for each instance of a word are used to train a neural network (NN) word recognition engine. Accuracy of recognition is evaluated using about 20 percent of the untrained word exemplars and signals from only one electrode pair, which is randomly drawn from the collection of electrode pairs, in a data recording session.

Five NN paradigms were considered for signal training classification, using the entire feature set: (1) scaled conjugate gradient nets; (2) Leavenberg-Marquardt nets; (3) probabilistic neural nets (PNNs); (4) modified dynamic cell structure (DCS) nets; and (5) linear classifiers. After comparison of the results, a scaled conjugate gradient net was chosen, for the following reasons. A Leavenberg-Marquardt net reaches the lowest mean square error level but requires too much system memory when dealing with large data sets, even where reduced memory variations are used. A signal having a low mean square error (MSE) does not necessarily correspond to, or produce, an improved generalization for new signals, where high sensor noise is present. PNN nets provide reasonable classifications but require very large training sample sizes to reach stable probabilities and do not appear to be superior in ultimate pattern discrimination ability. A dynamic cell structure (DCS) net provides fast net training, which is attractive for real time adaptation, but is less compact for the anticipated applications that are memory sensitive. A scaled conjugate gradient network has fast convergence with adequate error levels for the signal-noise ratios encountered in the data; and the performance is comparable to the Leavenberg-Marquardt performance. The scaled conjugate gradient network uses a "trust" region gradient search criterion, which may contribute to the superior overall results of this approach.

In other EMG tasks, we successfully applied Hidden Markov Models (HMMs), but these appear to be most effective for non-multi-modal signal distributions, such as are associated with single discrete gestures, rather than with the temporally non-stationary, sub-audible signal patterns of concern here. An HMM approach also requires sensitive pre-training to accurately estimate transition probabilities. A hybrid HMM/neural net approach, is an alternative.

In order to quickly explore many experimental situations using different transform variations, we have operated in a simulated real time environment that has been developed and used at N.A.S.A. Ames, wherein EMG signals are recorded to file and are later used to train and test the signal recognition engines. Our initial three test subjects were not given immediate feedback about how well their sub-audible signals were recognized. However, some learning occurred as each test subject was permitted to view the subject's EMG signals.

Figure 3:
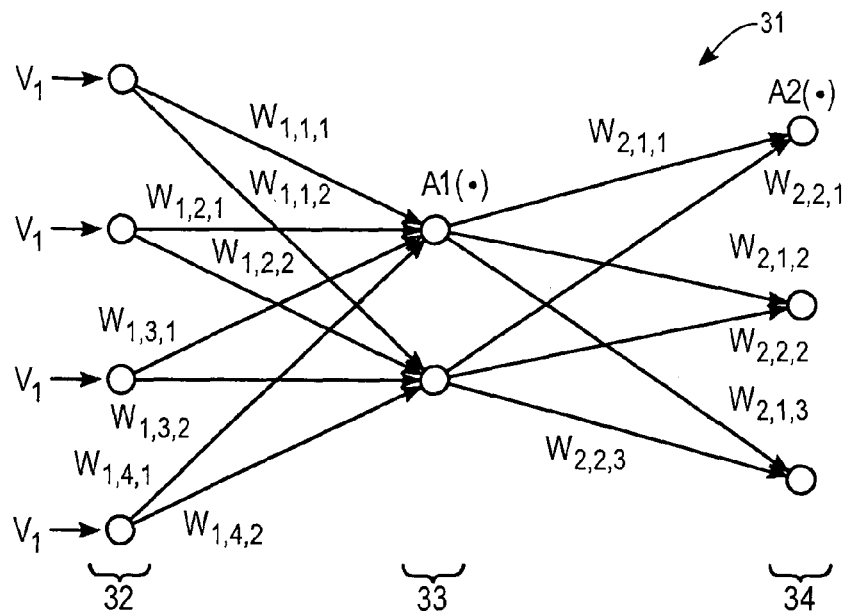
FIG. 3 illustrates a simplified neural network classifier, with one hidden layer, that may be applied in practicing the invention.

FIG. 3 illustrates a simplified example of a neural network classifier 31 with one hidden layer, configured to analyze a vector of feature values provided according to the invention. The NN configuration 31 includes a first (input) layer 32 having four input nodes, numbered k=1, . . . , K (K=4 here), a second (hidden) layer 33 having two intermediate nodes, numbered h=1, . . . , H (H=2 here), and a third (output) layer 34 having three output nodes, numbered g=1, . . . , G (G=3 here). A practical neural net classifier may have tens or hundreds of input nodes, hidden layer(s) nodes and output nodes. The input values $v_k$ received at the first layer of nodes are summed and a first activation function A1 is applied to produce $$u_h = A1\left\{\sum_{k=1}^{K} w_{1,k,h} \cdot v_k + 1 \cdot b\right\} \ (h = 1, \ldots, H), \quad (1)$$

where the quantities $w_{1,k,h}$ are weight coefficients connecting the nodes in the first layer to the nodes in the second layer and b is a bias number. The intermediate values received at the second layer are summed and a second activation function A2 is applied to produce $$t_g = A2\left\{\sum_{h=1}^{H} w_{2,h,g} \cdot u_h + 1 \cdot b\right\} \ (g = 1, \ldots, G), \quad (2)$$

where the quantities $w_{2,h,g}$ are weight coefficients connecting the nodes in the second layer to the nodes in the third layer. Here, A1 and A2 may be, but need not be, the same activation function, and more than one activation function can be used in a given layer. More than one hidden layer can be included, by obvious extensions of the notation. This formalism will be used in the following development of the NN analysis, in FIGS. 4 and 5.

Training Procedure.

The term "training procedure," according to one embodiment of the invention, includes the following actions: (1) receive R spoken instances, of a sub-audible EMG signal, for at least one known word; (2) detect the beginning of each SASP containing an instance, using a thresholding procedure; (3) for each SASP, create a window, having a selected length Δt(win), that includes the SASP; (4) apply a "signal processing transform" (SPT) to each instance of one of the SASPs; (5) form a matrix (which can be one-dimensional, a vector) from the SPT values for each instance of the SASP; (6) tessellate the matrix into cells, with each cell represented by a cell "feature", for each instance; (7) (re)format the cell features as entries or components of a vector; (8) (optionally) normalize the vector entries; (9) receive the vector entries for each instance of the SASP in a neural network classifier; (10) for all instances of each word, identify sets of reference weight coefficients for the vector entry values that provide a best match to a reference pattern that corresponds to the words considered; and (11) use the reference weight coefficients in a neural network analysis of an unknown word received by the system.

Figure 4A:
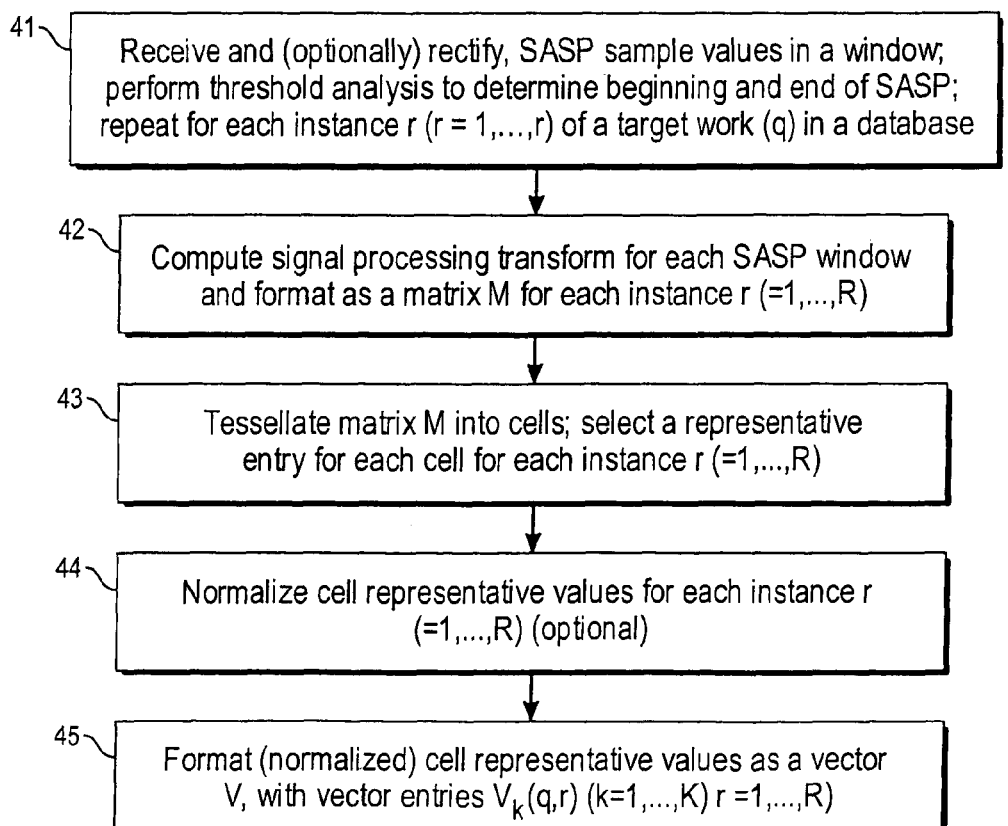
FIGS. 4 and 5 are high level flow charts of procedures for practicing a training procedure and a word recognition procedure according to the invention.
Figure 4B:
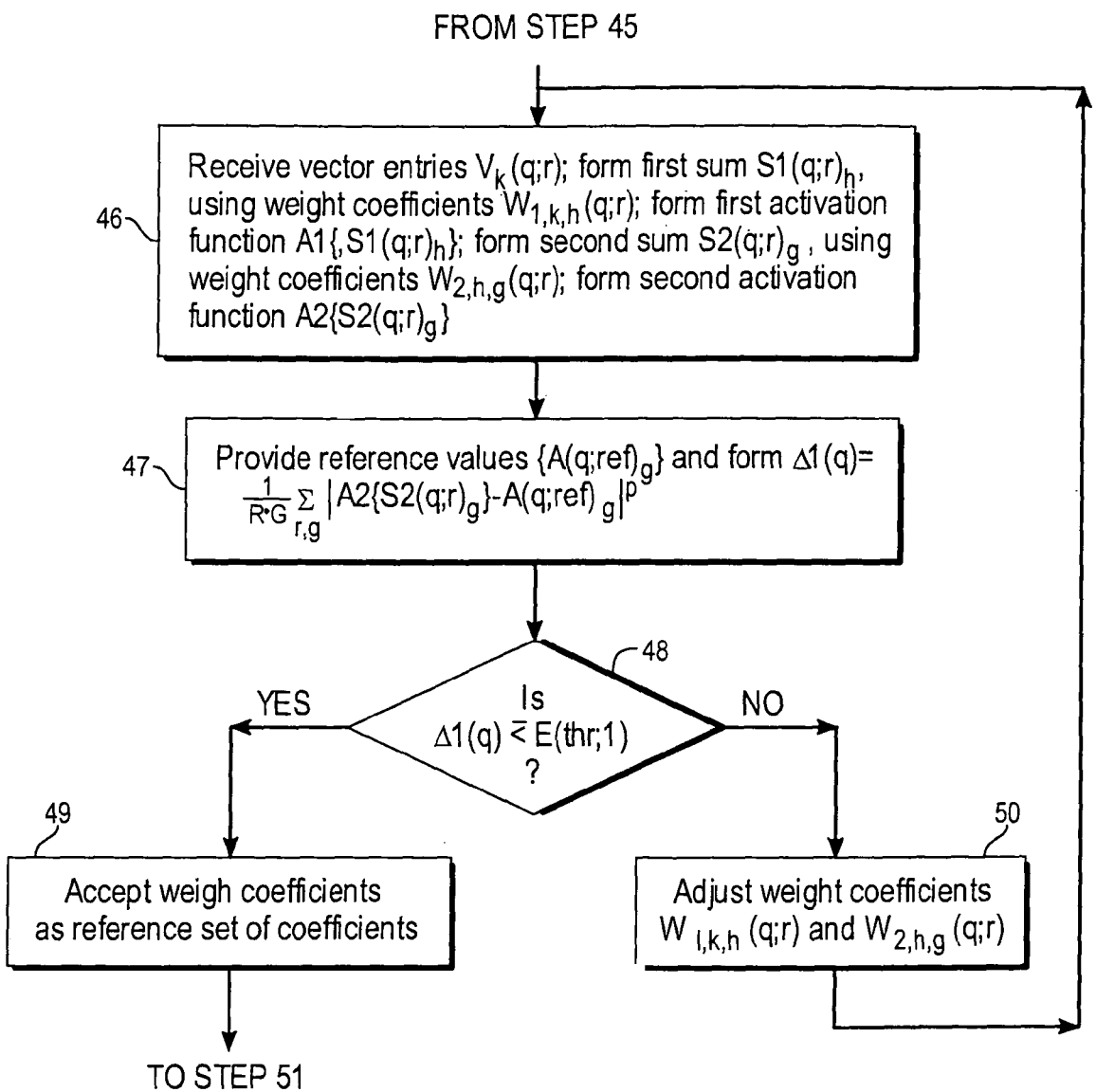

FIG. 4 is a high level flow chart illustrating a procedure for practicing a training procedure according to the invention. In step 41, a sequence of length Δt(win)=1-4 sec (preferably, Δt(win)≈2 sec) of sampled signal values is received, and a sample thresholding operation is performed to determine where, in the sequence, a sub-audible speech pattern (SASP) begins. SASPs representing samples of a known word at a selected rate (e.g., about 2 KHz) are identified, recorded and optionally rectified. Signal rectification replaces the signal at each sampling point by the signal magnitude (optional). R spoken instances, numbered r=1, . . . , R (R≧10), of a given word (SASP) are preferably used for training the system to recognize that SASP.

In step 42, a Signal Processing Transform operation is performed on the pattern SASP over the window length Δt(win) for each spoken instance r=1, . . . , R, and for each word, numbered q=1, . . . , Q in a database, to provide a spectrum for the received signal for each of the windowed samples. As used herein, a "Signal Processing Transform" (SPT) has a finite domain (compact support) in the time variable, provides a transform dependent upon at least one transform parameter (e.g., window length, number of samples used in forming the transform, scale factor, frequency, etc.), allows summation or integration over this parameter, and a collection of these transforms for different values of the transform parameter is mathematically complete.

The SPT operation in step 42 may rely upon a short time interval Fourier transforms (STFTs), discrete wavelets (DWTs) and continuous wavelets (CWTs) using Daubechies 5 and 7 bases; dual tree wavelets (DTWTs) with a near_sym_a 5,7 tap filter and a Q-shift 14,14 tap filter; Hartley Transforms; Linear Predictive Coding (LPC) coefficients, and uniformly and nonuniformly weighted moving averages, or any other suitable transforms. The spectrum obtained by this operation (expressed as a function of one or more transform parameters) is a sequence of data transform samples, formatted as an m-row-by-n-column matrix M (or as a vector, with m=1 or n=1) having a first matrix axis (along a row) and a second matrix axis (along a column), with each matrix entry representing a concentration or intensity associated with a scale factor and/or window time. In a preferred embodiment, for a wavelet SPT, the n columns (e.g., n=30) represent an increasing sequence of window times for constant scale factor, and the m rows (e.g., m=129) represent a dyadic sequence of scale factors used to provide the spectrum for a given window time. Alternatively, the m rows may represent window times and the n columns may represent scale factors. A sequence of further operations is performed on the matrix, as discussed in the following.

In step 43, the matrix entries (e.g., wavelet coefficients) are tessellated or decomposed into "cells," with each cell representing a grouping of adjacent matrix entries (e.g., a rectangular grouping of one or more sizes), where the entries in a given cell resemble each other according to one or more criteria and associated metric(s). A matrix may be divided into uniform size cells or may be divided according to statistical similarity of cell entries or according to another criterion.

As an example, consider the following 4×6 matrix $$M = \begin{vmatrix} 1 & 2 & 3 & 4 & 5 & 6 \\ 1 & 3 & 5 & 7 & 9 & 11 \\ 2 & 6 & 12 & 20 & 15 & 8 \\ 3 & 18 & 14 & 7 & 9 & 6 \end{vmatrix} \quad (3)$$

The matrix M may be expressed as a vector or single stream of data entries. If one decomposes this matrix M into four 2×3 non-overlapping rectangular groups of entries (cells), the corresponding arithmetic means of the four cells become $$<M> = \begin{vmatrix} 2.5 & 7 \\ 9.17 & 10.83 \end{vmatrix} \quad (4)$$

which can represent each of the four cells, and the corresponding standard deviations of the four cells become $$<\Delta M> = \begin{vmatrix} 42.75 & 291 \\ 628, 97 & 117.36 \end{vmatrix} \quad (5)$$

Tessellation of the matrix entries into the four 2×3 non-overlapping groups of entries in this example may depend, for example, upon the relative sizes of the entries in the matrix M. More generally, each cell is represented by a "feature" associated therewith, which may be one or more associated numerical coefficient values, such as the entries in the matrix <M> shown in Eq. (4), or a maximum or minimum value from the cell entries.

In step 44, each cell representative value or feature in the tessellated matrix is optionally normalized by dividing this value by (i) a sum of all values of the cell representatives, (ii) a sum of the magnitudes of all values of the cell representatives, (iii) the largest magnitude of the cell representative values or (iv) another selected sum. Alternatively, a normalized cell representative value is formed as a difference between the cell representative value and a mean value for that population, divided by a standard deviation value for that population. Alternatively, a normalized cell representative value is formed as a difference between the cell representative value and a maximum or minimum cell representative value for the tessellated matrix. One goal of normalization is to reduce the dynamic range of the cell representative values for each instance r=1, . . . , R and each word q=1, . . . , Q.

In step 45, the (normalized) cell representative values determined in step 34 are arranged as a vector of length K=number of cells) or other suitable entity for subsequent processing.

In step 46, the vector entries $v_k(q;r)$ are received and processed by a neural net (NN) classifier by multiplying each vector entry $v_k(q;r)$ by a first set of weight coefficients $w_{1,k,h}(q;r)$ ($0 \leq w_{1,k,h} \leq 1$; k=1, . . . , K; h=1, . . . , H) and summing these weighted values to form $$S1(q;r)_h = \sum_k w_{1,k,h}(q;r) \cdot v_k(q;r) \quad (h=1, \ldots, H) \quad (6)$$

This process is repeated for each of the R spoken instances of the known word. Each of the weighted sums $S1(q;r)_h$ becomes an argument in a first activation function $A1\{S1(q;r)_h\}$, discussed in the following, also in step 46. Also in step 46, a second set of sums is formed $$S2(q;r)_g = \sum_h w_{2,h,g}(q;r) \cdot A1\{S1(q;r)_h\}, \quad (g=1, \ldots, G) \quad (7)$$

which becomes an argument in a second activation function $A2\{S2(q;r)_g\}$.

In step 47, the system provides a set of reference values $\{A(q;ref)_g\}_g$ for the word number q and computes a set of differences $$\Delta 1(q) = (1/R \cdot G) \sum_{r,g} |A2\{S2(q;r)_g\} - A(q;ref)_g|^p \quad (8)$$

where p is a selected positive number. The system determines, in step 48, if $\Delta 1(q) \leq \epsilon(thr;1)$, where $\epsilon(thr;1)$ is a selected threshold error, preferably in a range 0.01 and below.

Figure 5A:
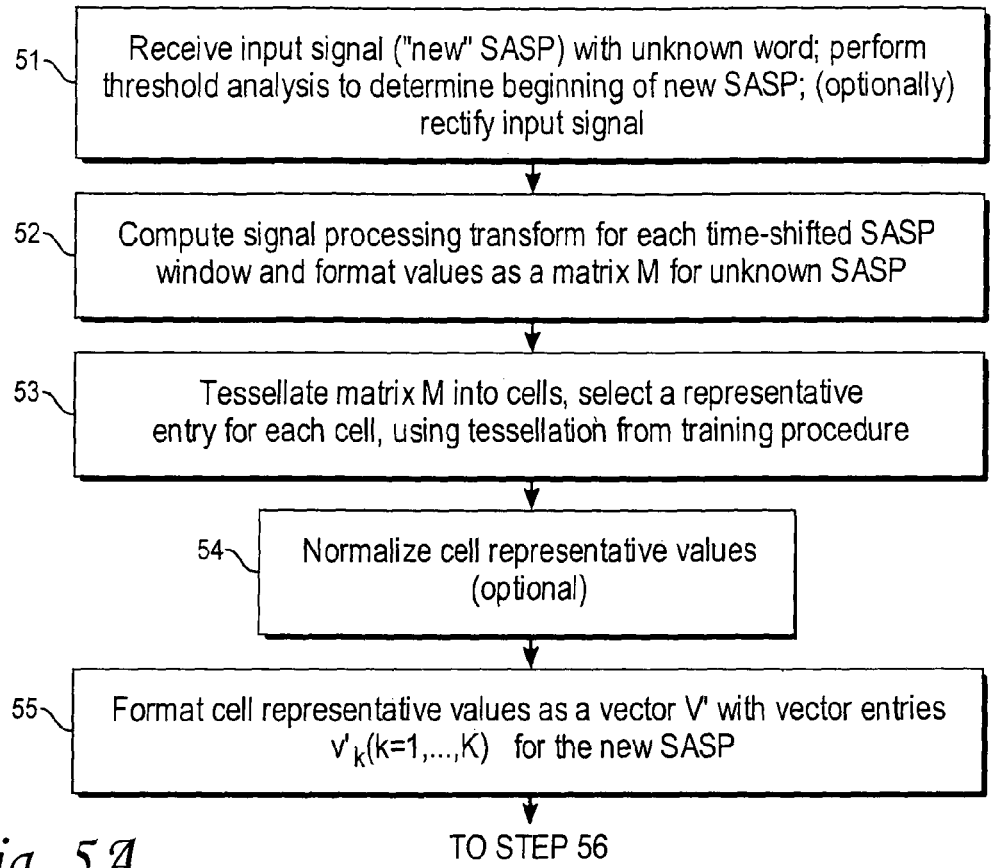
Figure 5B:
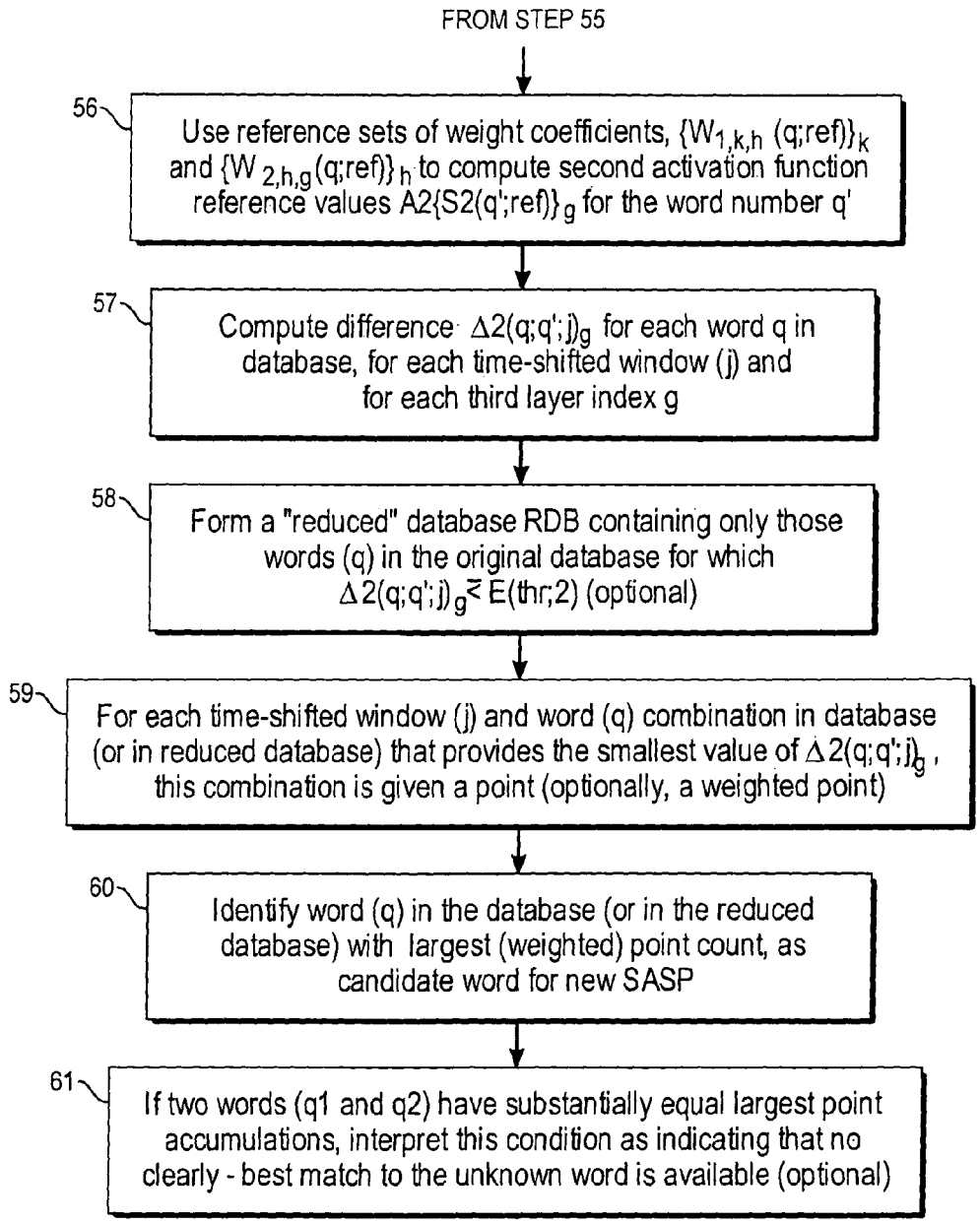

If the answer to the query in step 48 is "yes," the system accepts this estimated reference set, in step 49, for use in the word recognition procedure, illustrated in FIG. 5. If the answer to the query in step 48 is "no," the first and second weight coefficients, $w_{1,k,h}(q;r)$ and $w_{2,h,g}(q;r)$, are adjusted to provide another set of estimated reference values $A(q;ref)_g$, in step 50, using a neural net analysis approach, and steps 46-48 are repeated. In the neural net analysis, a gradient method is applied to a geometric space with coordinates $w_{1,k,h}(q;r)$ and $w_{2,h,g}(q;r)$, as discussed subsequently.

In the procedure illustrated in FIG. 4, two suitable activation functions are $$A\{S\}=\tanh(S)=\{\exp(a \cdot S)-\exp(-a \cdot S)\}/\{\exp(a \cdot S)+\exp(-a \cdot S)\}, \quad (9A)$$

$$A\{S\}=1/\{1-\exp(-a \cdot S)\}, \quad (9B)$$

having the respective ranges of $[-1,1]$ and $[0,1]$ for $-\infty<S<\infty$, where a is a selected positive number. Other monotonically increasing, finite range functions can also be used as activation functions.

For each word q, each reference value $A(q;ref)_g$ ($q=1, \ldots, Q$) may be determined by different first reference sets of weight coefficients, $\{w_{1,k,h}(q;ref)\}_k$ and/or by different second reference sets of weight coefficients $\{w_{2,h,g}(q;ref)\}_h$, which are now fixed for the word number q. The reference values $A(q;ref)_g$ and the associated first and second reference sets of weight coefficients will henceforth be used for comparison with not-yet-identified SASP words. Optionally, the NN has F hidden layers and F+1 sets of weight coefficients ($F \geq 1$).

In an alternative embodiment, in steps 46-50, a first universal set of weight coefficients, $\{w_{1,k,h}(ref)\}_k$ and a second universal set of weight coefficients $\{w_{2,h,g}(ref)\}_h$, not dependent upon the particular word (q), replace the first and second sets of weight coefficients $\{w_{1,k,h}(q;ref)\}_k$ and $\{w_{2,h,g}(q,ref)\}_h$. In this alternative embodiment, where the database includes at least two words, the order of the instances of different (transformed) words must be randomized, and the neural network classifier seeks to identify first and second universal sets of weight coefficients, $\{w_{1,k,h}(ref)\}_k$ and $\{w_{2,h,g}(ref)\}_h$, that are accurate for all words in the database.

Word Recognition Procedure.

The word recognition procedure, according to one embodiment of the invention, includes the following actions: (1) receive a sub-audible EMG signal, representing an unknown word; (2) detect the beginning of an SASP, using a thresholding procedure; (3) create a window, having a selected length $\Delta t(win)$, that includes the SASP; (4) create a sequence of time-shifted windowed versions of the received SASP, with time shifts equal to a multiple of a time displacement value $\Delta t(displ)$; (5) apply a signal processing transform (SPT) to each of the time-shifted versions of the SASP, (6) form a matrix (which can be one-dimensional, a vector) from the SPT values for each of the time-shifted versions of the SASP; (7) tessellate the matrix into cells, with each cell represented by a cell "feature"; (8) (re)format the cell features as entries or components of a vector; (9) (optionally) normalize the vector entries; (10) receive the vector entries, for each time-shifted version of the SASP in a trained neural network classifier, and identify a word from a database that provides a best match to an activation function value corresponding to each time-shifted version of the SASP, (11) accumulate a point for each best match; and (12) identify a word, if any, with the highest point count as the best match to a word corresponding to the received SASP.

FIG. 5 is a high level flow chart of a word recognition procedure that uses the results of the training procedure shown in FIG. 4. In step 51, A sub-audible signal pattern (SASP) representing a sample of a "new" (unknown) word (referred to as number q') is received and optionally rectified.

A sequence of sample values is received at the selected rate used in FIG. 4. A sample thresholding operation is performed to determine where, in the sequence, the sub-audible speech pattern (SASP) begins. A sequence of J time-shifted, partially overlapping windows, numbered $j=1, \ldots, J$ ($J \geq 2$), is formed from the signal representing the new word, with consecutive start times displaced by multiples of a selected displacement time such as $\Delta t(displ)=0-\Delta t(win)/2$.

In step 52, an SPT operation is performed on the new SASP over the window length $\Delta t(win)$, to provide a first spectrum for the new word for each of the windowed samples. In step 53, the matrix entries are tessellated or decomposed into the same cells that were used for each word in step 43 of FIG. 4. In step 64, each cell representative value or feature in the tessellated matrix is optionally normalized. In step 55, the cell representative values are arranged as a vector V' having vector entries $v'_k$ ($k=1, \ldots, K$) or other suitable entity for subsequent processing. In step 56, the first and second reference sets of weight coefficients, $\{w_{1,k,h}(q;ref)\}_k$ and $\{w_{2,h,g}(q;ref)\}_h$, (or $\{w_{1,k,h}(ref)\}_k$ and $\{w_{2,h,g}(ref)\}_h$) used to compute the activation function reference value $A2\{S2(q;ref)\}_g$ (or $A\{S(ref)\}_g$) for the word number q are used to compute an activation function $A2\{S2'(q';ref)\}_g$, as in Eq. (6).

In step 57, the system computes differences $$\Delta 2(q,q';j)_g = |A2\{S2'(q';j;ref)\}_g - A(q;ref)_g| \quad (10)$$

for each word (q) in the database, for each time shifted window (j) and for each NN third layer index g. Optionally, in step 58, only those words (q) in a "reduced" database RDB, for which $$\Delta 2(q;q';j)_g \leq \epsilon(thr;2)$$

is satisfied, are considered in accumulating points in step 49, where $\epsilon(thr;2)$ is a selected second threshold error, preferably in a range 0.01 and below. Optionally $\epsilon(thr;1)=\epsilon(thr;2)$, but this is not required.

In step 59, for each time-shifted window (numbered $j=1, \ldots, J$), each word (q) in the database (or in the reduced database RDB) that provides the smallest value $\Delta 2(q;q';j)_g$, among the set of values computed in Eq. (11), is given one point or vote. In step 60, the word (q) in the database with the largest number of points is interpreted as the unknown word (q') that was received. Optionally, the point(s) accumulated according to the minimum value of $\Delta 2(q;q';j)_g$ can be weighted, for example, by multiplying the number 1 by a weight function $WF\{\Delta 2(q;q';j)_g\}$ that is monotonically decreasing as the argument $\Delta 2(q;q';j)_g$ increases. Two examples of suitable weighting functions are $$WF(s)=a+b \cdot \exp[-\alpha s], \quad (12A)$$

$$WF(s)=\{c-d \cdot (s)^\beta\}^e, \quad (12B)$$

where a, b, c, $\alpha$ and $\beta$ and the product $d \cdot e$ are non-negative numbers, not all 0. If two or more words (e.g., q1 and q2) in the database have substantially the same largest point accumulation, the system optionally interprets this condition as indicating that no clearly-best match to the unknown word (q') is available, in step 61.

Figure 6:
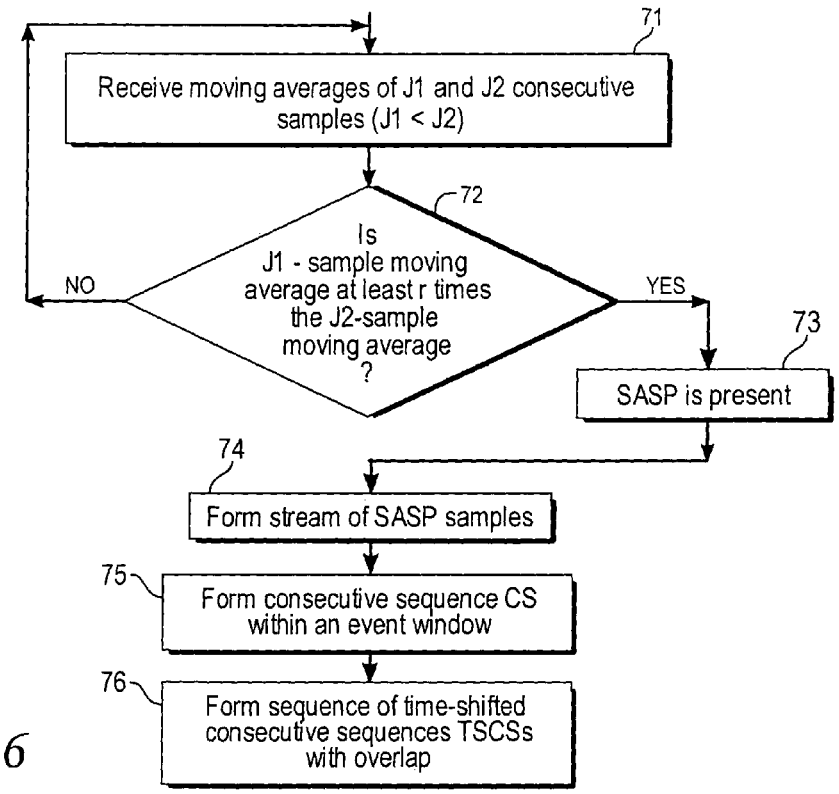

FIG. 6 sets forth in more detail a first embodiment for a thresholding operation for step 41 in FIG. 4. In step 71, two or more moving averages of consecutive sequences of H1 sampled values and H2 sampled values are formed (H1<H2), where, for example, H1=10 and H2=20 is a suitable choice. Initially, the sample amplitudes and both moving averages are substantially 0, except for the presence of noise. As the system encounters the beginning of a sub-audible speech pattern (SASP), the shorter H1-sample will rise before the longer H2-sample rises, when applied to consecutive sample runs with the same starting point. In step 72, the system determines if the moving average of the H1-samples is at least a multiple μ of the moving average of the H2-samples, where μ is a selected ratio ≧1. If the answer to the query in step 62 is "no," the system returns to step 71 and continues to receive samples and to form the two moving averages. If the answer to the query in step 72 is "yes," the system infers that an SASP is present and that an "SASP threshold" has been crossed; and the system begins to divide succeeding time intervals into epochs, in step 73. Other methods of determining when an SASP threshold has been crossed can also be used here.

In step 74 of FIG. 6, a set of signal samples is received, preferably as a stream of data, and the magnitude or absolute value of each SASP signal sample is formed (optional). In step 75, a consecutive sequence CS of the signal samples is formed within an event window, preferably of length Δt(win)=1-4 sec. In step 76 the system creates a new sequence TSCS of time shifted consecutive sequences, with the beginning of each TSCS being shifted by a selected time delay amount Δt(displ) relative to the immediately preceding TSCS. Each TSCS will be processed and classified by a neural network classifier. The number of (above-threshold, consecutive) TSCSs may be used as a parameter in the comparisons in FIG. 4. The system then proceeds to step 42 of FIG. 4 and continues.

Figure 7:
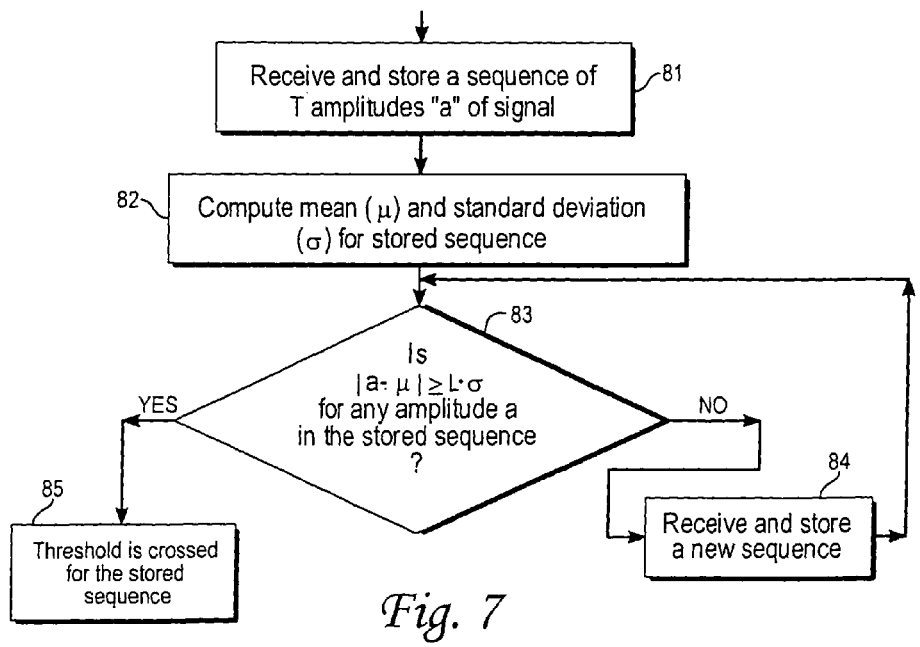

FIG. 7 illustrates a dynamic threshold adjustment procedure, relying in one implementation on a Bollinger band, that may be used in step 41. In step 81, a sequence of T amplitudes "a" of the signal are received and stored. In step 82, a mean (μ) and standard deviation (σ) are computed for the stored sequence. In step 83, the system determines if the magnitude of the difference |u−μ| is at least equal to L·σ for at least one amplitude u in the stored sequence, where L is a selected positive number (e.g., L=4-10). If the answer to the query in step 83 is "no", the system replaces the stored sequence by a new sequence (e.g., shifted by one sample value), in step 84, and returns to step 82; no threshold has yet been crossed in this situation. If the answer to the query in step 83 is "yes", a threshold has been crossed within the stored sequence and a position representing the beginning of the word can be identified, in step 85.

Figure 8:
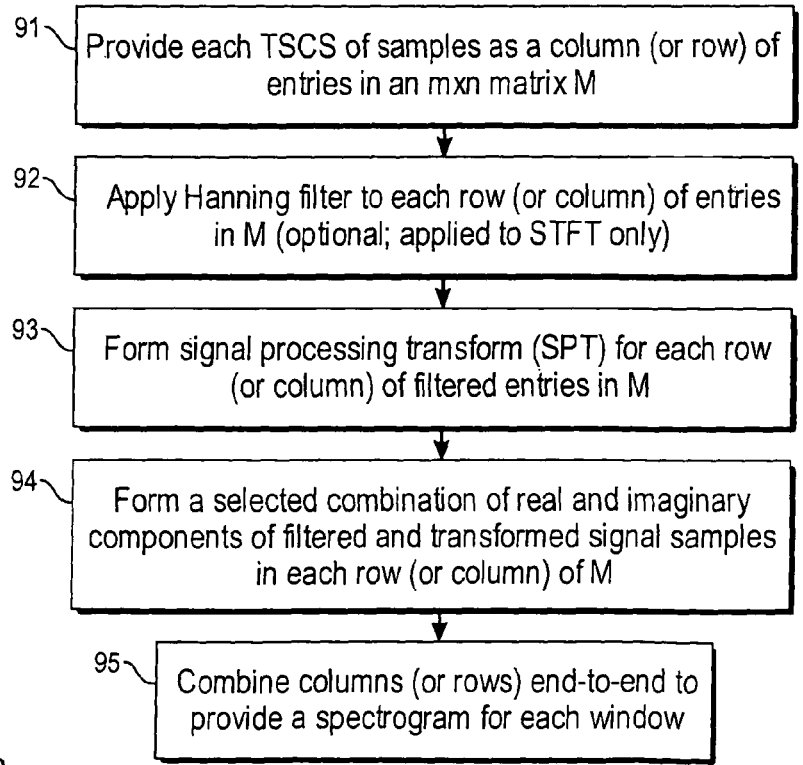
FIGS. 6-10 are flow charts of intermediate procedures associated with the steps in the FIG. 4 or FIG. 5 flow chart.

FIG. 8 is a flow chart providing more detail on step 42 in FIG. 4, where a Fourier transform is used for the SPT operation In step 91, the data stream is optionally reformatted into a sequence of columns (or into rows) of signal samples, with each column (or row) corresponding to a TSCS, according to the format required for computer analysis. In step 92, a Hanning filter is optionally applied to each STFT window. In step 93, an SPT operation is performed for each row of (filtered) signal samples. The particular SPT used may be a conventional Fourier transform (applied to a window of finite width), a dual wave tree wavelet transform, a Daubechie transform, a Hartley transform, a moving average with uniform or non-uniform weights, or similar transforms. The particular choice will depend upon the known characteristics of the data received for analysis. Preferably, the SPT of the signal sample sequences will provide real and imaginary components that can be combined and processed as appropriate. In step 94, the system forms a selected combination of real and imaginary components of the (filtered and transformed) signal samples in each row. In step 85, the columns (or rows) are combined, end-to-end, to provide a spectrogram for each (time-overlapped) window.

Figure 9:
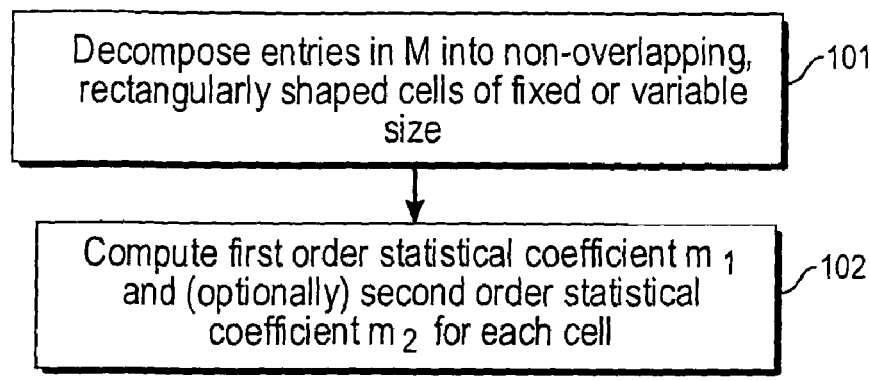

FIG. 9 is a flow chart providing more detail on step 43 in FIG. 4, according to a first embodiment for tessellation of the matrix M. In step 101, the entries within the matrix M are decomposed into non-overlapping, rectangularly-shaped cells of one or more selected sizes (e.g., 2×3 or 5×5 or 10×7) so that every entry belongs to precisely one cell. Cells adjacent to a boundary of the matrix M may have a different (residual) size. In step 102, a first order statistical coefficient $m_1$ (e.g., arithmetic mean, median, mode or largest value) is computed for, and associated with, each cell, representing an average magnitude or other feature for the entries within the cell. A second order statistical coefficient $m_2$ (e.g., standard deviation) is optionally computed for each cell. Here, the individual values within each cell may be substantially different so that the first order coefficient $m_1$ associated with a given cell may not be very representative of the individual entries. However, the cells in this embodiment are of fixed size, which is useful in some of the following computations. At one extreme, each cell may be a single entry in the matrix M.

Figure 10:
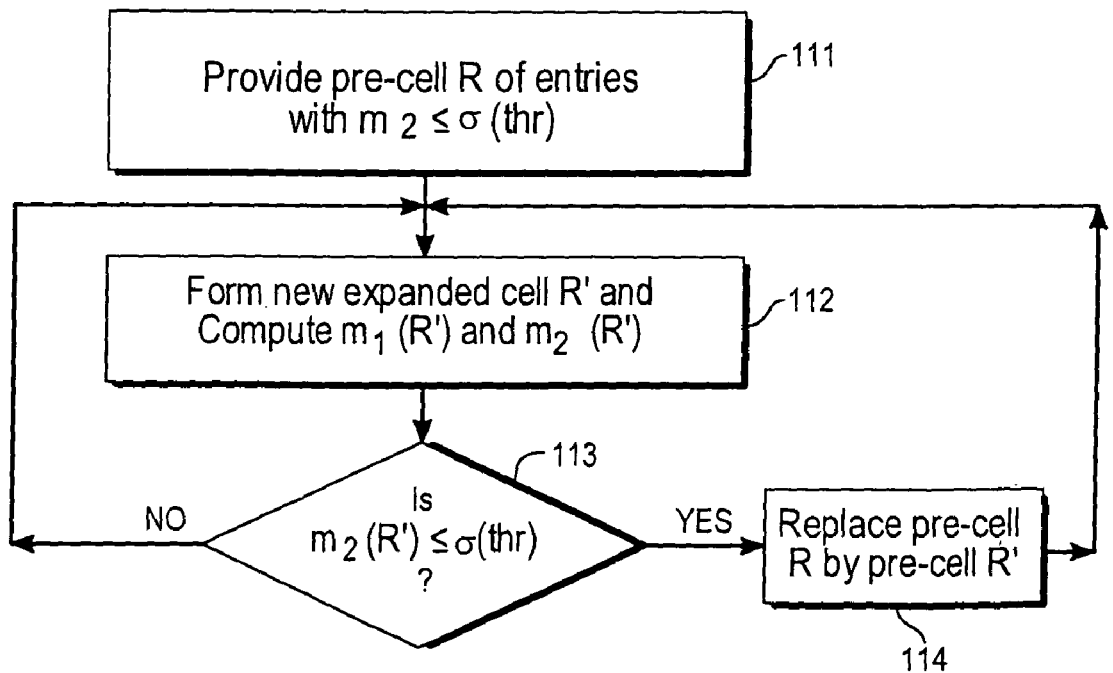

FIG. 10 is a flow chart of an alternative embodiment for tessellation of the matrix M (step 43 in FIG. 4). In step 111, the matrix entries are tentatively aggregated into "pre-cells," with each pre-cell initially being a single entry and having a second order statistical coefficient $m_2$ of 0. Consider a general pre-cell, such as a rectangular set E of entries, having a selected first order statistical coefficient $m_1$ (arithmetic mean or median or mode) and having a second order statistical coefficient $m_2$ no larger than a selected positive threshold value σ(thr). In step 112, an expanded pre-cell set E', having one more row or one more column than E, is formed, and statistical coefficients m (E') and $m_2$(E') are computed for this pre-cell E'. In step 113, $m_2$(E') is compared with the threshold value σ(thr). If the coefficient $m_2$(E') for the expanded set E' is no larger than the threshold value σ(thr), the pre-cell is redefined, in step 114, to include the expanded set E', and the system returns to step 112. The redefined set E' is further expanded in step 115 by one row or one column to form a new set E", and the system returns to step 112. If $m_2$(E') is larger than the threshold σ(thr), the expanded set E' is rejected, the pre-cell includes the set E but not this particular expanded set E', and the system returns to step 112. However, another expanded set can be formed from E, by adding a different row or column, and the coefficient $m_2$ for this new expanded set can be computed and compared with σ(thr). At some level, the system identifies a rectangular or other shape set Ê of maximum size whose coefficient $m_2$(Ê) is no larger than the threshold value σ(thr), and this maximum size set becomes a cell. This process is repeated until every entry in a cell is "similar" to every other entry in that cell, as measured by the threshold value σ(thr). The number of matrix entries has been reduced to a smaller number of cells. The cells may be rectangular but do not necessarily have the same size. In this approach, the entries in a cell are represented by the coefficient $m_1$ for that cell, but the cell size is determined by the adjacent entries for which $m_2$(E)≦σ(thr).so that the entries may be more "similar" to each other.

One practical approach for neural network training is back-propagation of errors, together with conjugate gradient analysis to identify global minima. This approach is discussed, for example, by T. Masters in *Practical Neural Network Recipes in C++*, Morgan Kaufman Publ., 1993, pp. 102-111.

With reference to step 50 in FIG. 4 in the preceding, a conjugate gradient algorithm with trust region (to limit the extension in any direction in coordinate space) is applied to the error term sum, ε(q) with q fixed, to determine an extremum point (minimum) for the received cell representatives.

For example, the basic Fletcher-Reeves algorithm can be utilized, wherein a direction of steepest descent $$p_0 = -g_0 \quad (13)$$

for the surface or function is first identified; a line search is performed to estimate the optimal distance to be moved along the current search direction ($p_k$)

$$x_{k+1} = x_k + \alpha_k p_k; \quad (14)$$

and a conjugate direction $$p_k = g_k + \beta_k p_{k-1}, \quad (15)$$

is determined for the new search direction. For the Fletcher-Reeves update, the parameter $\beta_k$ is chosen according to $$\beta_k = g_k \cdot g_k / \{g_{k-1} \cdot g_{k-1}\}. \quad (16)$$

For the Polak-Ribiere update, the parameter $\beta_k$ is chosen according to $$\beta_k = \Delta g_{k-1} \cdot g_k / \{g_{k-1} \cdot g_{k-1}\}, \quad (17)$$

where $\Delta g_{k-1} = g_{k-1} - g_{k-2}$ is the preceding change in the direction of steepest descent. In any conjugate gradient approach, it is preferable to periodically reset the search direction to the steepest descent gradient. In a particular approach developed by Powell and Beale, resetting occurs when little orthogonality remains between the present gradient and the preceding gradient; the corresponding test is whether the inequality $$|g_{k-1} \cdot g_k| \geq 0.2 |g_k|^2. \quad (18)$$

is satisfied. Other variations on the corresponding algorithms can also be used here.

What is claimed is:

1. A method for training and using a system to identify a sub-audible signal formed by a source of sub-audible sounds, the method comprising providing a computer that is programmed to execute, and does execute, the following actions::
   (1) receiving R signal sequences, numbered r=1, . . . , R (R≧2), with each sequence comprising an instance of a sub-audible speech pattern ("SASP"), uttered by a user, and each SASP including at least one word drawn from a selected database of Q words, numbered q=1, . . . , Q with Q≧2;
   (2) estimating where each of the R SASPs begins and ends in the sequences;
   for each of the signal sequences, numbered r=1, . . . , R:
   (3) providing signal values of a received signal, number r, within a temporal window having a selected window width $\Delta t(win)$; and
   (4) transforming each of the R SASPs, using a Signal Processing Transform ("SPT") operation to obtain an SPT value that is expressed in terms of at least first and second transform parameters comprising at least a signal frequency and a signal energy associated with the SASP;
   (5) providing a first matrix M with first matrix entries equal to the SPT values for the R SASPs, ordered according to the at least first and second transform parameters along a first matrix axis and along a second matrix axis, respectively, of the matrix M;
   (6) tessellating the matrix M into a sequence of exhaustive and mutually exclusive cells of matrix entries, referred to as M-cells, with each M-cell containing a collection of contiguous matrix entries, where each M-cell is characterized according to at least one selected M-cell criterion;
   (7) providing, for each M-cell, an M-cell representative value, depending upon at least one of the first matrix entries within the M-cell;
   (8) formatting the M-cell representative values as a vector V with vector entry values $v_k(q;r)$, numbered k=1, . . . , K (K≧2);
   (9) analyzing the vector entry values $v_k(q;r)$ using a neural net classifier, having a neural net architecture, and a sequence of estimated weight coefficient values associated with at least one of the neural net classifier layers, where the neural net classifier provides a sequence of output values dependent upon the weight coefficient values and upon the vector entry values $v_k(q; r)$;
   (10) receiving the vector entries $v_k(q;r)$ and forming a first sum $$S1(q;r)_h = \Sigma_k W_{1,k,h}(q;r) \cdot v_k(q;r),$$

where $\{w_{1,k,h}(q;r)\}\cdot$ is a first selected set of adjustable weight coefficients that are estimated by a neural net procedure;
   (11) forming a first activation function $A1\{S1(q;r)_h\}$, that is monotonically increasing as the value $S1(q;r)_h$ increases;
   (12) forming a second sum $$S2(q;r)_g = \Sigma_h w_{2,h,g}(q;r) \cdot A1\{S1(q;r)_h\} \ (g=1, \ldots, G; G \geq 1),$$

where $w_{2,h,g}(q;r)\cdot$ is a second selected set of adjustable weight coefficients that are estimated by the neural net procedure;
   (13) forming a second activation function $A2\{S2(q;r)_g\}$ that depends upon the second sum $S2(q;r)$, that is monotonically increasing as the value $S2(q;r)$ increases;
   (14) providing a set of reference output values $\{A(q; ref)_g\}$ as an approximation for the sum $A2\{S2(q,r)_g\}$ for the R instances of the SASP;
   (15) forming a difference $\Delta 1(q) = (1/R \cdot G) \ \Sigma_{r,g} |A2\{S2(q;r)_g\} - A](q; ref)_g|^{p1}$, where p1 is a selected positive exponent;
   (16) comparing the difference $\Delta 1(q)$ with a selected threshold value $\epsilon(thr;1)$;
   (17) when $\Delta 1(q)[[>]]$ is greater than $\epsilon(thr;1)$, adjusting at least one of the weight coefficients $w_{1,k,h}(q;r)$ and the weight coefficients $w_{2,h,g}(q;r)$, returning to step (10), and repeating the procedures of steps (10)-(16); and
   (18) when $\Delta 1(q)$ is no greater than $\epsilon(thr;1)$, interpreting this condition as indicating that at least one of an optimum first set of weight coefficients $\{w_{1,k,h}(q;r;opt)\}$ and an optimum second set of weight coefficients $\{w_{2,h,g}(q;r;opt)\}$ has been obtained, and using the at least one of the first set and second set of optimum weight coefficients to receive and process a new SASP signal and to estimate whether the received new SASP signal corresponds to a reference word or reference phrase in the selected database.

2. The method of claim 1, wherein said computer is further programmed to execute, and does execute, said step (18) by a procedure comprising the following actions:
   (19) receiving a new sub-audible speech pattern SASP signal uttered by said user containing an instance of at least one unknown word, referred to as a "new" word, indexed with an index q' that may be in said database of Q;
   (20) estimating where the new word begins and ends in the new SASP
   (21) providing signal values for the new SASP within each of said temporal windows, numbered j=1, . . . , J with J≧2, that are shifted in time relative to each other by selected multiples of a selected displacement time $\Delta t(displ)$;

(22) for the signal values within each of the time-shifted windows, numbered j=1, . . . , J:
- (23) transforming each of the signal values of the new SASP, using said Signal Processing Transform (SPT) operation to obtain new SASP SPT values with said at least first and second transform SPT values;
- (24) providing a second matrix M' with second matrix entries equal to the new SASP SPT values, ordered according to said at least first and second transform parameters along a first and second matrix axes, respectively, of the second matrix M';
- (25) tessellating the second matrix M' into a sequence of exhaustive and mutually exclusive M'-cells that correspond to said M-cells for said tessellated matrix M, where each M'-cell is characterized according to at least one selected M'-cell criterion;
- (26) providing, for each M'-cell in the second matrix M', a M'-cell representative value depending upon at least one of the second matrix entries within the M'-cell;
  - (27) formatting the M'-cell representative values as a vector V' with vector entry values where $v'_k(q';r)$ refers to new word or phrase index (k=1, . . . , K);
- (28) applying said neural net classifier and said reference set of said optimum first set and said optimum second set of weight coefficients to compute said neural net classifier output values for each of the time-shifted sequences of the new SASP;
- (29) receiving the vector entries $v'_k(q';r)$ and forming a first sum $$S1'(q';q'';r)_h = \Sigma_k w'_{1,k,h}(q'';r;opt) \cdot v'_k(q';r),$$

where weight coefficients $w'_{1,k,h}(q'';r;opt)$ are said optimized first weight values coefficients found for a candidate word or phrase (q'') in the database;
  - (30) forming a first new word activation function $A1'\{S1'(q';q'';r)_h\}$ that depends upon the first sum $S1'(q';q'';r)_h$;
  - (31) forming a second sum $$S2'(q';q'';r)_g = \Sigma_h w'_{2,h,g}(q'';ropt) \cdot A1'\{S1'(q';q'';r)_h\}$$
$$(g=1, \ldots G; G \geq 1),$$

where weight coefficients $w'_{2,h,g}(q'';r)$· are said optimized second weight coefficients found for a candidate word or phrase (q'') in the database;
  - (32) forming a second new word activation function $A2'\{S2'(q';q'';)_g\}$ that depends upon the second sum $S2'(q';q'';r)_h$;
  - (33) providing a set of reference output values $\{A'(q'';ref)_g\}$ associated with each candidate word or phrase (q'') in the database;
  - (34) forming a comparison difference $$\Delta1'(q'';q') = (1/R \cdot G)\Sigma_{r,g}|A2'\{S2'(q';q'';r)_g\} - A'(q'';ref)_g|^{p2},$$

where p2 is a selected positive exponent;
  - (35) comparing the difference $\Delta1(q'';q')$ with a selected threshold value $\epsilon(thr;2)$;
  - (36) when the difference $\Delta1(q'';q')$ is greater than $\epsilon(thr;2)$, returning to step (28) and repeating the procedures of steps (28)-(35) with another candidate word or phrase (q'') in the database; and
  - (37) when $\Delta1(q'';q')$ is no greater than $\epsilon(thr;2)$, interpreting this condition as indicating that the present candidate word or phrase (q'') is the "new" word (q'), and indicating that the present candidate word or phrase q'' is likely to be the "new" word q'.

3. The method of claim 2, wherein said computer is further programmed to execute, and does execute, the following actions:

replacing at least one of said matrix cell features by a normalized feature for each of said cells corresponding to said matrix M.

4. The method of claim 2, wherein said computer is further programmed to execute, and does execute, the following actions:

when at least two distinct words, number q1 and q2, in said database satisfy $\Delta1'(q';q''=q1) \approx \Delta1'(q';q''=q2)$, and $\Delta1'(q';q1)$ and $\Delta1'(q';q2)$ are substantially less than $\Delta1'(q';q'')$ for any word $q'' \neq q1$ and $q'' \neq q2$ in said database, and interpreting this condition as indicating that said new word included in said new SASP cannot be unambiguously identified.

5. The method of claim 2, wherein said computer is further programmed to execute, and does execute, the following actions:

choosing said weighting for said weighted points from the group of weighting consisting of (i) substantially uniform weighting and (ii) a weighting that decreases monotonically as said magnitude of said comparison difference increases.

6. The method of claim 2, wherein said computer is further programmed to execute, and does execute, the following actions:

determining said reference set of said weight coefficients to be independent of said word number q in said database.

7. The method of claim 2, wherein said computer is further programmed to execute, and does execute, the following actions:

determining said reference set of said weight coefficients so that at least one reference setnof said weight coefficients so that at least one reference set weight coefficient for a first selected word number q1 in said database differs from a corresponding reference set weight coefficient for a second selected word number q2 in said database.

8. The method of claim 2, wherein said computer is further programmed to execute, and does execute, the following actions:

selecting said window width $\Delta t(win)$ in a range 1-4 sec.

9. The method of claim 2, wherein said computer is further programmed to execute, and does execute, the following actions:

selecting each of said matrix cells to be rectangularity shaped.

10. The method of claim 9, wherein said computer is further programmed to execute, and does execute, the following actions:

selecting at least two of said matrix cells to have different sizes.

11. The method of claim 2, wherein said computer is further programmed to execute, and does execute, the following actions:

choosing said SPT operations from the group of SPT operations consisting of (i) a windowed short time interval Fourier Transform (STFT); (ii) discrete wavelets (DWTs) and continuous wavelets (CWTs) using Daubechies 5 and 7 bases; (iii) dual tree wavelets (DTWTs) with a near sym_a 5,7 tap filter and a Q-shift 14,14 tap filter; (iv) Hartley Transform; (v) Linear Predictive Coding (LPC) coefficients; (vi) a moving average of a selected number of said sample values with uniform weighting; and (vii) a moving average of a selected number of said sample values with non-uniform weighting.

17

12. The method of claim 2, wherein said computer is further programmed to execute, and does execute, the following actions:

selecting said database to include at least one of the words "stop", "go", "left", "right", "alpha", "omega", "one", "two", "three", "four", "five", "six", "seven", "eight", "nine" and "ten".

13. The method of claim 2, wherein said computer is further programmed to execute, and does execrute, the following actions:

selecting said error threshold number to lie in a range $e(thr;1) \leq 0.01$.

14. The method of claim 2, wherein said computer is further programmed to execute, and does execute, the following actions:

applying a backpropagation of error method in said neural net classifier analysis of said features of said cells of said matrix M.

15. A method for training and using a system to identify a sub-audible signal formed by a source of sub-audible sounds, the method comprising providing a computer that is programmed to execute, and does execute, the following actions:

(1) receiving R signal sequences, numbered $r=1, \ldots, R (R \geq 2)$, with each sequence comprising an instance of a specified sub-audible speech pattern ("SASP"), uttered by the user, and each SASP including at least one word drawn from a selected database of Q words, numbered $q=1, \ldots, Q$ ($Q \geq 2$);

(2) estimating where each SASP begins and ends for each of the signal sequences;

(3) providing signal values of the received signal, number r, within a temporal window having a selected window width $\Delta t(win)$;

(4) transforming each of the R SASPs, using an Signal Processing Transform ("SPT") operation to obtain an SPT value that is expressed in terms of at least one transform parameter having a sequence of parameter values, including a signal frequency an a signal energy associated with the SASP;

(5) providing a first matrix M with first matrix entries equal to the SPT values for the R SASPs, ordered according to each of the at least first and second transform parameters along a first matrix axis and along a second matrix axis, respectively of the matrix M;

(6) tessellating the matrix M into a sequence of exhaustive and mutually exclusive, cells of the matrix entries, referred to as M-cells, with each M-cell containing a collection of contiguous matrix entries, where each M-cell is characterized according to at least one selected M-cell criterion;

(7) providing, for each M-cell, an M-cell representative value depending upon at least one of the first matrix entries within the M-cell;

(8) formatting the cell representative values as a vector V with vector entry values $v_k(q;r)$ numbered $k=1, \ldots, K$ ($K \geq 2$);

(9) analyzing the vector entry values $v_k(q;r)$ using a neural net classifier, having a neural net architecture with at least one neural net hidden layer, and a sequence of estimated weight coefficient values $w_k(q;r)$ associated with that at least one neural net hidden layer, where the neural net classifier provides a sequence of neural net output values $A(q,r)$, equal to a sum over the index k of each of the vector entry values $v_k(q,r)$ multiplied by a corresponding weight coefficient value $w_k(q,r)$;

18

(10) providing a set of neural net reference output values $\{A(q; ref)\}$ as an approximation for the sum $A(q,r)$ for the R instances of the SASP ($r=1, \ldots, R$);

(11) forming a difference $\Delta(q) = \Sigma_r |A(q;r)\} \ A(q;ref)|^p$, where p is a selected positive exponent

(12) comparing the difference $\Delta(q)$ with a first threshold value $\epsilon(thr;1)$.

(13) when $\Delta(q)$ is greater than a first positive threshold value $\epsilon(thr;1)$, adjusting at least one of the weight coefficients $w_k(q;r)$, returning to step (9), and repeating the procedures of steps (9)-(12); and

(14) when $\Delta(q)$ is no greater than $\epsilon(thr;1)$, interpreting this condition as indicating that at least one of an optimum set of weight coefficients $\{w_k(q;r;opt)\}$ has been obtained, and using the set of optimum weight coefficients to receive and process a new SASP signal and to estimate whether the received new SASP signal corresponds to a reference word or reference phrase in the selected database.

16. The method of claim 15 wherein said computer is further programmed to execute, and does execute, the following actions:

choosing said SPT operations from a group of SPT operations consisting of (i) a windowed short time interval Fourier Transform (STFT); (ii) discrete wavelets (DWTs) and continuous wavelets (CWTs) using Daubechies 5 and 7 bases; (iii) dual tree wavelets (DTWTs) with a near sym_a 5,7 tap filter and a Q-shift 14,14 tap filter; (iv) Hartley Transform; (v) Linear Predictive Coding (LPC) coefficients;

(vi) a moving average of a selected number of said sample values with uniform weighting; and (vii) a moving average of a selected number of said sample values with non-uniform weighting.

17. The method of claim 15, wherein said computer is further programmed to execute, and does execute, the following actions:

selecting at least first and second of said matrix cells to have a cell dimension, measured along a corresponding matrix axis of said matrix M, that is different for the first cell and for the second cell.

18. The method of claim 15, wherein said computer is further programmed to execute, and does execute, the following actions:

(15) receiving a new sub-audible speech pattern SASP1 uttered by said user, comprising an instance of at least one unknown word, referred to as a "new" word, identified with an index q1, that may be but is not necessarily drawn from said database of Q words;

(16) estimating where the new word begins and ends in the new SASP1;

(17) providing signal values of the received SASP1 within each of said temporal windows;

(18) transforming each of the signal values of the new SASP1, using said Signal Processing Transform (SPT) operation to obtain new SASP1 SPT values, where each SASP1 SPT value is expressed in terms of said at least first and second transform parameters, including a signal frequency and a signal energy associated with the SASP1;

(19) providing a second matrix M1 with second matrix entries equal to SPT values for the SASP1, ordered according to each of said at least first and second transform parameters along first and second matrix axes of the second matrix M1;

(20) tessellating the matrix M1 into a sequence of exhaustive and mutually exclusive M1-cells that correspond to said sequence of said M-cells for said matrix M where each M1-cell is characterized according to said or more cell criteria for said M-cells;

(21) providing, for each M1-cell, an M1-cell representative value depending upon at least one of the second matrix entry values within the M1-cell;

(22) formatting the M1-cell representative values as a vector V1 with vector entries $v1_k(q1)$, numbered k=1, ..., K (K≧2), where q1 refers to said index associated with said new word;

(23) analyzing the vector entry values $v1_k(q1)$ using said neural net classifier, having said neural net architecture with said at least one neural net hidden layer, and a sequence $w_k(q1,opt)$ of said optimum weight coefficients $w_k(q1,r1;opt)$, associated with said at least one neural net hidden layer, and averaged over said R instances (r1=1, ..., R) of said SASP uttered by said user in claim 15,

(24) providing a neural net output value A1(q1), equal to a sum over the index k of each of the vector entry values $v1_k(q1)$ multiplied by the corresponding averaged optimum weight coefficient value $w_k(q1,opt)$;

(25) providing a set of neural net reference output values {A1(q';ref)} as an approximation for the sum A1(q1) for the R1 instances of the SASP1, where q' is one of said indices corresponding to said database of Q words;

(26) forming a comparison difference $\Delta1(q1,q') = |A1(q1)\} - A(q';ref)|^p$, where said quantities A1(q';ref) and p are determined as in claim 15;

(27) comparing the difference $\Delta1(q1,q')$ with said first threshold value $\epsilon(thr;1)$.

(28) when $\Delta1(q1,q')$ is greater than said first threshold value $\epsilon(thr;1)$, interpreting this condition as indicating that said sub-audible speech pattern SASP1 received is not a sub-audible speech pattern from said database with the corresponding number q1=q'; and

(29) when $\Delta1(q1,q')$ is no greater than $\epsilon(thr;1)$, interpreting this condition as indicating that said sub-audible speech pattern SASP1 received is likely to be a sub-audible speech pattern from said database, indexed by q', with the corresponding index q1.

* * * * *